United States Patent [19]

Sullivan et al.

[11] Patent Number: 5,517,355
[45] Date of Patent: May 14, 1996

[54] CARD ADAPTED FOR USE IN STEREOSCOPE

[75] Inventors: Katharyne M. Sullivan, Rush; John R. McCart, Rochester, both of N.Y.

[73] Assignee: XM Corporation, Rochester, N.Y.

[21] Appl. No.: 334,399

[22] Filed: Nov. 3, 1994

Related U.S. Application Data

[60] Division of Ser. No. 68,117, May 27, 1993, Pat. No. 5,384,655, and a continuation-in-part of Ser. No. 988,206, Dec. 19, 1992, abandoned.

[51] Int. Cl.$^6$ .......................... G02B 27/22; G02B 27/24
[52] U.S. Cl. .......................................... 359/474; 359/471
[58] Field of Search ................... 359/462, 474, 359/472, 477, 466, 467, 471

[56] References Cited

U.S. PATENT DOCUMENTS

| | | |
|---|---|---|
| 40,654 | 11/1863 | Tresize . |
| 472,196 | 4/1892 | McGrew . |
| 871,974 | 11/1907 | Verbeck ................... 359/474 |
| 906,774 | 12/1908 | Colwell ................... 359/474 |
| 1,579,025 | 3/1926 | Owens ................... 359/471 |
| 2,511,334 | 6/1950 | Gruber . |
| 2,616,333 | 2/1950 | Tinker . |
| 2,683,391 | 1/1950 | Nichols . |
| 2,842,027 | 7/1958 | Betti ................... 359/474 |
| 3,850,505 | 11/1974 | Ratliff, Jr. ................... 359/466 |
| 3,888,564 | 6/1975 | Lebow ................... 359/472 |
| 4,150,781 | 4/1979 | Silverman et al. ................... 359/2 |
| 4,457,584 | 7/1984 | Pryor ................... 359/471 |
| 4,561,723 | 12/1985 | Hamano et al. ................... 359/40 |
| 4,998,799 | 3/1991 | Brown ................... 359/466 |
| 5,136,423 | 8/1992 | Curtin ................... 359/474 |

FOREIGN PATENT DOCUMENTS

WO9118314  11/1991  WIPO ................... 359/462

*Primary Examiner*—Paul M. Dzierzynski
*Assistant Examiner*—Audrey Y. Chang
*Attorney, Agent, or Firm*—Larson & Taylor

[57] ABSTRACT

A stereoscopic image viewing device which can be used to create the effect of a stereoscopic image from back to back stereoscopically complementary views of an image, is disclosed. Also disclosed is a portable device for providing a stereoscopic image from a card which contains complementary stereoscopic views of an image in a manner whereby the images can be arranged substantially back to back. In addition, a novel card containing two stereoscopically complementary images, is disclosed. This card, when used in combination with the stereoscopic image viewing device, creates the effect of a stereoscopic image.

9 Claims, 3 Drawing Sheets

CARD ADAPTED FOR USE IN STEREOSCOPE

This application is a division of application Ser. No. 08/068,117, filed on May 27, 1993, now U.S. Pat. No. 5,384,655, which application is a continuation-in-part of application Ser. No. 07/988,206, filed on Dec. 9, 1992, now abandoned.

FIELD OF THE INVENTION

The present invention relates to a device for the creation of a stereoscopic image from back to back stereoscopically complementary images and to a novel card bearing stereoscopically complementary images in an arrangement which allows said images to be arranged back to back for viewing with the device or the invention.

BACKGROUND OF THE INVENTION

An excellent history of the stereoscope can be found in, "Foundations of the Stereoscopic Cinema: A Study in Depth," Lenny Lipton, Van Nostrand, Reinhold Company, New York, N.Y., pp. 21–28 (1982).

In this study, essentially two basic designs of the stereoscope are mentioned. The first, developed initially in 1833 by Wheatstone, required two diametrically opposed stereoscopically complementary images, one placed to the left of the left eye at a 90 degree angle to the line of sight and the other placed to the right of the right eye also at a 90 degree angle to the line of sight. The system required two mirrors, one for each eye/image and the mirrors reflected the right image to the right eye and the left image to the left eye.

The Wheatstone system, however, suffers from the disadvantage that two physically separate images are required to provide the stereoscopic effect and the disadvantage that the stereoscope was required to be relatively wide to accomodate the placement of the two images which must be outside of the observer's head.

In 1856, Brewster invented a lens based stereoscope which produced a stereoscopic image from two stereoscopically complementary images placed side by side directly in front of the observer. The Brewster system has some limitations including the requirement of special lenses to produce a stereoscopic effect, the need to place the images at the focal point of the lenses and to place the lenses at a particular distance from the observer.

Most or the patented stereoscopes are of the Brewster type employing side by side images and a lens system. Examples of variations on this system can be found in U.S. Pat. Nos. 2,511,334 and 3,850,505 and others which disclose the Viewmaster™ type devices, book viewing devices such as are found in U.S. Pat. Nos. 40,654; 472,196; 2,616,333 and 2,683,391; and foldable/mailable 3-D viewers for viewing from side by side post card images such as is disclosed in U.S. Pat. No. 5,136,423.

In addition, in recent patent literature such as U.S. Pat. No. 4,998,799, one finds a special device for viewing two stereoscopically complementary images which are positioned one above the other. This device has the advantages of not requiring adjustments to compensate for eye spacing, and the capability of using two photographs taken by a conventional camera to create a three dimensional image.

Further, U.S. Pat. No. 4,561,723 discloses an electronic stereoscopic viewing device whereby two side by side electronically generated images are employed to create a stereoscopic effect with the aid or a combined lens and mirror system.

It is the primary object of the present invention to provide a stereoscopic viewing device which can be used to create a stereoscopic image from back to back stereoscopically complementary images.

It is a second object of the present invention to provide a stereoscopic viewing device which can create a stereoscopic image from a single card bearing two stereoscopically complementary images which can be arranged back to back in relation to one another.

It is a third object of the present invention to provide a novel card which bears two stereoscopically complementary images in a manner such that said images can be arranged back to back for viewing with the device of the invention.

It is a fourth object of the present invention to provide a portable stereoscopic viewing device which can create a stereoscopic image from two stereoscopically complementary images arranged back to back.

These and other objects of the present invention will be apparent to a man of ordinary skill in the art from the description and drawings which follow.

SUMMARY OF THE INVENTION

The present invention relates to a stereoscopic viewing device for viewing a stereoscopic image created from first and second stereoscopically complementary images which are positioned substantially back-to-back relative to one another and substantially orthogonal to the line of sight of the observer.

The stereoscope includes a first image conducting means including a left eye viewing port positioned substantially orthogonal to the first image and at least one reflecting means for reflecting the first image to the left eye viewing port for visual perception of the first image by the left eye of an observer. The stereoscopic viewing device also includes a second image conducting means including a right eye viewing port positioned substantially orthogonal to the second image and at least one reflecting means for reflecting the second image to the right eye viewing port for visual perception of the second image by the right eye of an observer. In addition, the device includes a means for optically insulating the first and second image conducting means from one another to restrict optical transfer of the first and second images between the first and second image conducting means.

In a second aspect, the present invention relates to a card adapted for use in the stereoscopic viewing device of the present invention, said card bearing two stereoscopically complementary images and being adapted such that said two stereoscopically complementary images can be positioned substantially back to back relative to one another.

The stereoscopic viewing device of the present invention provides a convenient means of viewing a stereoscopic image created from a card bearing two stereoscopically complementary images arranged substantially back to back relative to one another.

These drawings and the description which follows are presented for the purpose of illustration and description only and are not to be construed as limiting the invention in any way. The scope of the invention is to be determined by the claims appended hereto.

DETAILED DESCRIPTION OF THE INVENTION

In the broadest aspect of the present invention, all that is required are two stereoscopically complementary images arranged substantially back to back relative to one another, right and left means for conducting these images to the right and left eyes of the observer and a means for restricting optical transfer between the right and left image conducting means to avoid image contamination. Thus, the device can be set up in a room, for example, and need not have a housing to be functional.

Figure 1:
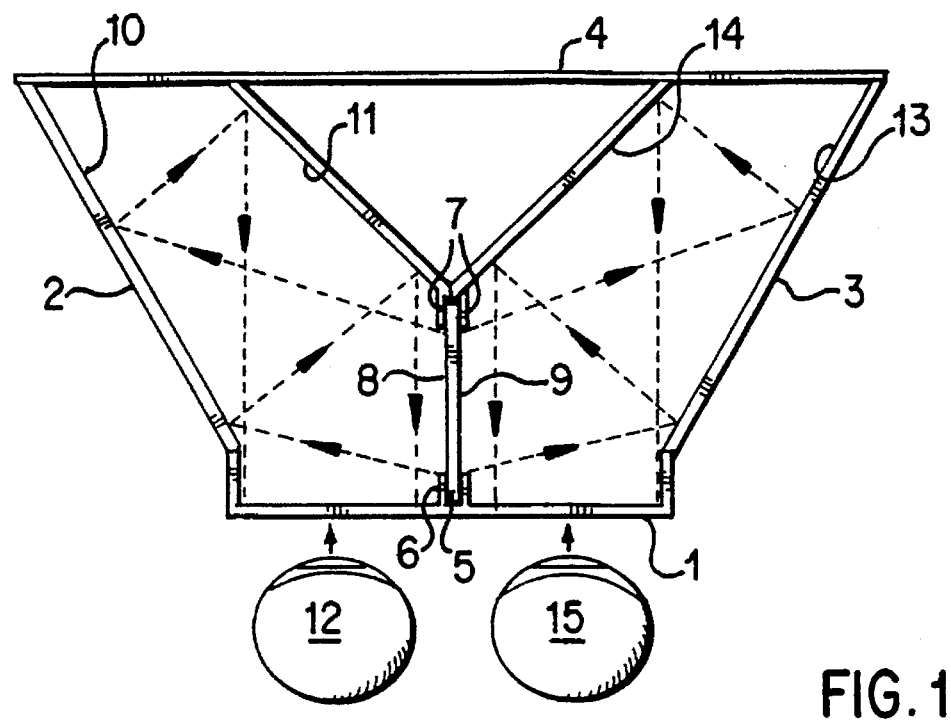
FIG. 1 is a top view of a stereoscopic viewing device in accordance with the present invention which employs a pair of mirrors for each image conducting means.

Referring now to FIG. 1 there is shown a top view of a stereoscopic device in accordance with the present invention. More particularly, the device includes a housing having a front portion 1, a left side portion 2, a right side portion 3 and a back portion 4.

Inside the housing is a card 5 held in place by card positioning means 6 and 7 which may be, for example, a pair of parallel, spaced runners between which the card 5 is held securely in place. The card 5 bears two complementary stereoscopic images, the left eye image appearing on the left surface 8 of the card 5 and the right eye image appearing on the right surface 9 of the card 5.

The image on the left surface 8 of card 5 is reflected by a first left reflective surface 10 to a second left reflective surface 11 and then to the left eye 12 of the observer via the left eye viewing port (not shown) in the front portion 1 of the housing. The image on the right surface 9 of card 5 is reflected by a first right reflective surface 13 to a second right reflective surface 14 and then to the right eye 15 of the observer via the right eye viewing port (not shown) in the front portion 1 of the housing.

The viewing ports may be, in the simplest embodiment, two holes in the front portion 1 of the housing. In more sophisticated embodiments, the viewing ports can extend outwardly from the housing to provide room for the viewer's nose when employing the viewing device. The spacing between the viewing ports should be sufficient to position them at the same distance apart as the eyes of the user. An even more sophisticated embodiment provides horizontally adjustable viewing ports to allow adustment of the spacing of the viewing ports to the particular eye spacing of the user.

From FIG. 1 it can be seen how the stereoscope of the present invention creates a stereoscopic image from two stereoscopically complementary pictures arranged substantially back to back relative to one another. The device is applicable in the trading card industry, for example, where 3"×2.5" cards can be printed bearing stereoscopically complementary images. The pictures on the card must be stereoscopically complementary, i.e. one picture must simulate the view of the left eye of the observer and the other picture must simulate the view of the right eye of the observer.

By the term, "substantially back to back relative to one another" is meant that the images face directions which are substantially 180 degrees from one another. By, "substantially" is meant from 160–200 degrees from one another. To accomodate variations from 180 degrees, minor adjustments to the orientation of the reflective surfaces 10, 11, 13 and 14 can be made. Otherwise, slight variations in the angle from 180 degrees can be employed to create special visual effects, if desired.

In another related application, in place of a card 5, two back to back electronic image generating devices can be used to create a stereoscopic moving picture. In this embodiment the card 5 is replaced by, for example, two television screens placed substantially back to back relative to one another, and which display stereoscopically complementary images.

Further, with the addition of a means for simultaneously displacing or varying one or both images, a sense of motion can be created for the observer thereby giving the effect of virtual reality.

A particularly advantageous feature of the device of the present invention is the placement of the first and second images orthogonal to the line of sight of the observer. This leads not only to the ability to employ a single card to generate the stereoscopic image, but also provides a convenient means for optically isolating the left portion of the viewing device from the right portion of the viewing device. Thus, the card 5 serves the dual function of providing the required stereoscopically complementary images and also optically isolates the left and right portions of the stereoscope thereby preventing contamination of the right eye image by the left eye image and vice versa.

The device can function with any number of optical transmission means including reflective surfaces, lenses, prisms and even optical fibers. Thus, the image conducting means is not limited to the particular means shown in the drawings. The image conducting means may be affixed to the inside of the housing. In another embodiment, the image conducting means may form an integral part of said housing.

Figure 2:
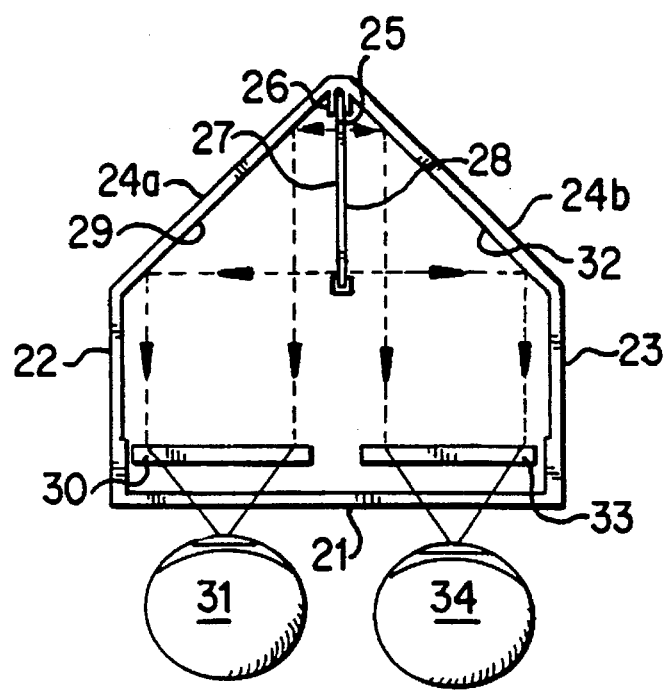
FIG. 2 is a top view of an alternative embodiment or a stereoscopic viewing device in accordance with the present invention which employs a combination of mirrors and lenses to form the image conducting means.

Referring now to FIG. 2, there is shown an alternative embodiment of the present invention employing a combination of reflection and refraction to create the stereoscopic image. More particularly, the device of FIG. 2 comprises a housing including a front portion 21, a left portion 22, a right portion 23 and a back portion 24a and 24b.

Inside the housing is a card 25 held in place by card positioning means 26 which may be, for example, a pair of parallel, spaced runners between which the card 25 is held securely in place. The card 25 bears two complementary stereoscopic images, the left eye image appearing on the left surface 27 of the card 25 and the right eye image appearing on the right surface 28 of the card 25.

The left eye image on the left surface 27 of the card 25 is reflected by the left reflective surface 29 to the left lens 30 which then focuses the left eye image onto the left eye 31 of the observer via the left eye viewing port (not shown) in the front portion 21 of the housing. The right eye image on the right surface 28 is reflected by the right reflective surface 32 to the right lens 33 which then focuses the right eye image on the right eye 34 of the observer via the right eye viewing port (not shown) in the front portion 21 of the housing.

A variation on the theme of FIG. 2 is to employ a four mirror system as shown in FIG. 1 and to include an image refracting means in the viewing ports. These image refracting means may be used to focus the image or to enlarge or reduce it in size. Another possibility is to employ the image refracting means in the viewing ports to focus on and magnify particular portions of the image. Of course, removable viewing ports or viewing ports including several different lenses which can be independently employed, can be used to achieve different levels of magnification or any other desired effects.

In order to provide the highest quality stereoscopic image, it is preferred to build the housing from a light reflective material such as white card stock, plastic and/or other white or light colored material. Further, it is preferred to leave the top and/or the bottom of the housing open to allow light to enter the housing and illuminate the stereoscopically complementary images. In order to keep the stereoscope relatively dust free, optional caps (not shown) for the top and bottom can be provided. The cap(s) could, for example, snap on and off so that during use, sufficient light would be available for viewing the stereoscopic image and, when not in use, the cap(s) can be replaced to keep the inside of the stereoscope clean. One or both of the cap(s) may also include a slot or a reclosable opening to allow insertion of the card 5 through the cap(s) into the card positioning means 6,7 without removing the cap(s) from the stereoscope.

In yet another embodiment, the top and/or bottom of the housing may be made from a light transmitting material such as clear plastic and may optionally be removable. In this manner, the stereoscope can be closed on all sides keeping the reflective surfaces clean and making shipping and handling more convenient, while still allowing sufficient light inside to illuminate the card 5. In still another embodiment, an artificial light source can be included in the housing or the top or bottom cap. Even lighting of the pictures is important to provide a good quality stereoscopic image and thus, a dome-shaped cap made from a light-reflective material and including a light source, is preferred.

In still another embodiment, the housing forms a shell into which a removable insert may be inserted. Such a removable insert is preferably made from a clear or light reflective material and may be designed to fit snugly into the housing. One or more of the reflective surfaces 10,11,13,14 are affixed to, or form an integral part of, the removable insert such that when the insert is placed in the housing the reflective surfaces 10,11,13,14 are properly positioned to produce the stereoscopic image. When less than all of the reflective surfaces 10,11,13,14 are associated with the removable insert then the remaining reflective surfaces 10,11,13,14 may be associated with the housing.

The primary advantage of this embodiment is that it allows convenient and easy replacement of one or more reflective surfaces 10,11,13,14. In this manner, repair of the device is facilitated and, more importantly, a variety of special stereoscopic effects can be produced by inserting different types of reflective surfaces 10,11,13,14 into the stereoscope. For instance, curved reflective surfaces can be employed to make images look wider, narrower, longer, shorter, etc.

Further, means may be provided in the housing or the cap(s) for the storage of a plurality of cards. Such means may be in the form of a slot in one or more of the portions 1–4 of the housing or the cap(s), or in the form of a recess in one or more of the same locations, said recess being provided with some means for retaining the cards in place during storage. Other card storage means are possible and the most preferred means will be determined by the number of cards to be stored and the costs of production for the particular design including such means.

The stereoscope of the present invention may also be offered in the form of a model kit of parts along with assembly instructions. This embodiment has the advantages of allowing the device to be mailed or shipped in a more convenient form and it caters to the do-it-yourself market who may wish to assemble and customize their stereoscope. The design would be essentially the same as that shown in FIGS. 1–2 except that at least the housing would be made up of several distinct parts which would have to be assembled.

Figure 3:
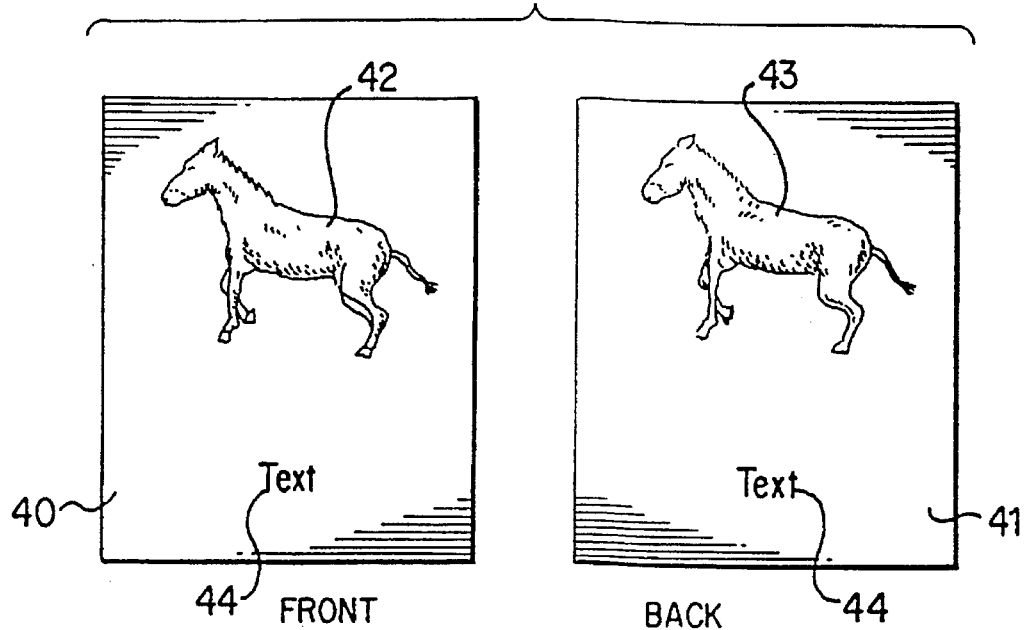
FIG. 3 depicts the first and second sides of a stereoscopic card in accordance with the present invention.

Referring now to FIG. 3, there is shown a card 5 in accordance with the present invention. More particularly, the card 5 comprises a front side 40 and a back side 41 which are interchangeable. The front side 40 bears the left eye image 42 of the stereoscopic picture to be seen by the viewer. The back side 41 bears the right eye image 43 of the stereoscopic picture. The card 5 is positioned in the stereoscopic viewer so that the left eye image 42 faces the left eye side of the viewer and the right eye image 43 faces the right eye side of the viewer. The card 5 may also contain text 44 on one or both sides of the card 5. As shown in FIG. 3, the images 42, 43 each have the same orientation on the front side 40 and back side 41 of the card 5, respectively.

The card 5 of FIG. 3 is the most preferred embodiment of the present invention as it allows current manufacturers of 3"×2.5" trading cards to switch over to the production of stereoscopic trading cards without having to make significant changes in their machinery and/or manufacturing processes.

The text 44 is optional and need not be included on the card. However, if text is desirable, for example for statistics to go along with an action photograph of a sports personality, it can be included anywhere on the card so long as the portion of the card which aligns with the image conducting means of the stereoscope still contains the stereoscopically complementary images. Thus, the stereoscope could allow viewing of, for example, only 60% of the card surface to thereby leave 40% of the card surface for textual matter.

Figure 4:
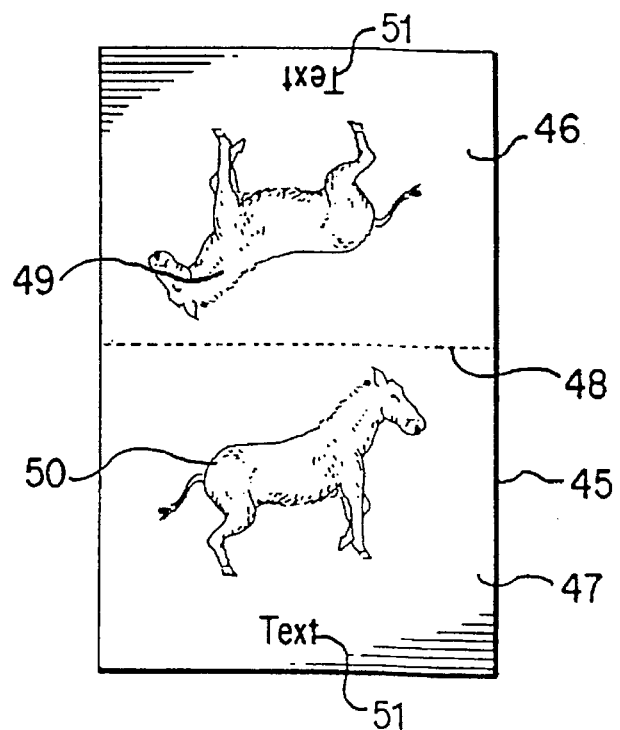
FIG. 4 depicts the front of a foldable stereoscopic card in accordance with the present invention.

Referring now to FIG. 4, there is shown an alternative embodiment of a card 5 in accordance with the present invention. More particularly, in FIG. 4 is shown one surface of a foldable card 45 having a top portion 46 and a bottom portion 47, which are interchangeable. The top portion 46 is divided from the bottom portion 47 by a fold line 48.

The top portion 46 bears the left eye image 49 and the bottom portion 47 bears the right eye image 50. Again, either or both of the top portion 46 and the bottom portion 47 may bear text 51. However, in this embodiment of the invention, it is preferred to put text on the opposite surface (not shown) of the card 45.

The card 5 of FIG. 4 represents an alternative embodiment of the invention which is particularly useful in circumstances where it is desirable to include a significant amount of textual information along with the stereoscopic image on the card. This embodiment would be particularly suitable for a travel log or for educational stereoscopic cards.

The card 5 may fold as shown in FIG. 4 or the stereoscopically complementary images can appear side by side on the same surface of the card 5. The card 5 with side by side images would also fold in half between the images to thereby allow the images to be arranged substantially back to back in the stereoscopic viewing device.

In a more sophisticated embodiment of the invention, additional information about the picture can be provided by adding a magnetic strip to the card 5 and equipping the stereoscopic device with a means for reading and displaying the contents of the magnetic strip.

Figure 5:
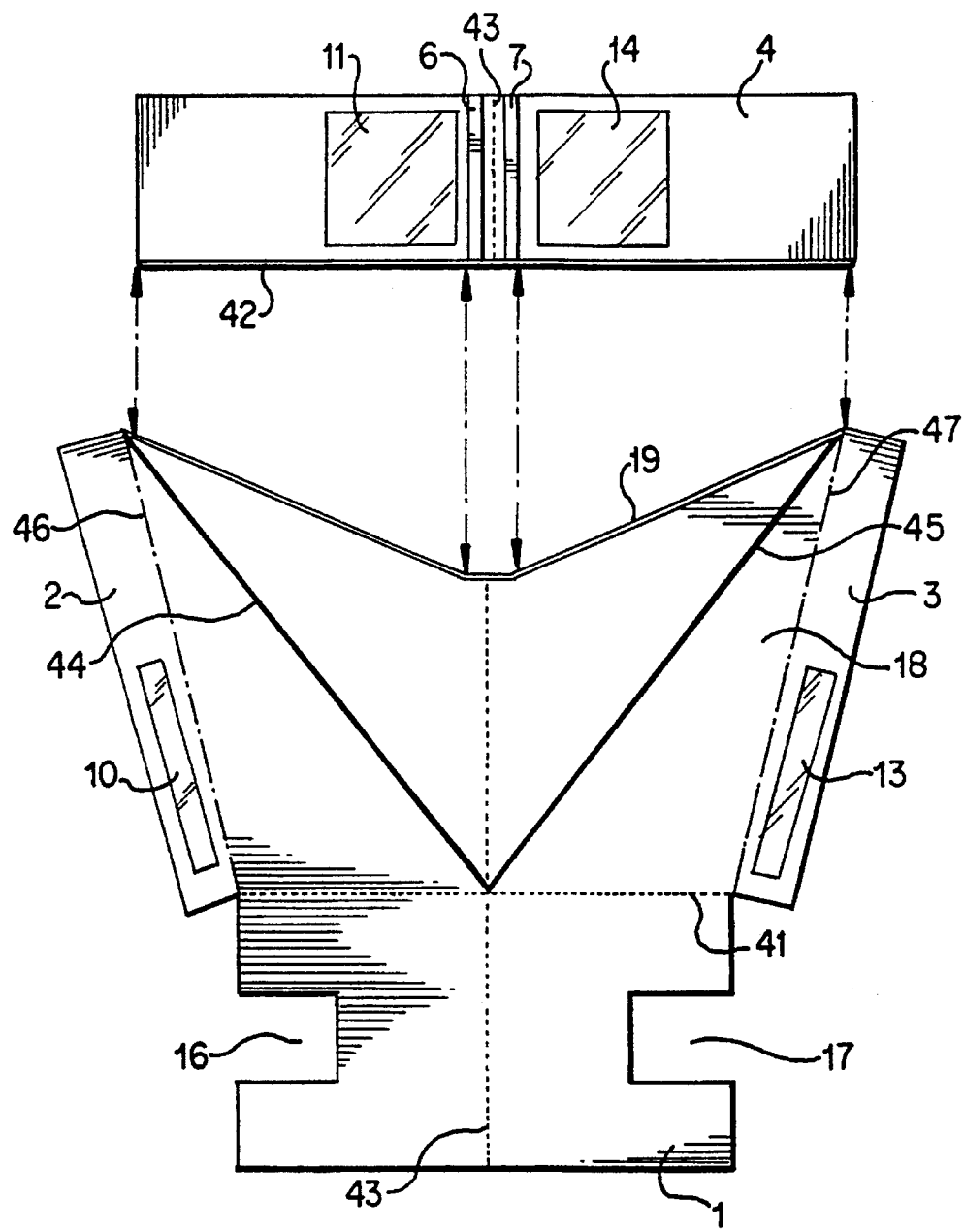
FIG. 5 depicts a collapsible version of a stereoscopic viewing device in accordance with the present invention.

Referring now to FIG. 5, there is shown a top view of a collapsible version of a stereoscope in accordance with the present invention, which stereoscope is partially collapsed in FIG. 5.

More particularly, the collapsible device shown in FIG. 5 includes a housing having a front portion 1, a left side portion 2, a right side portion 3, a back portion 4, and a bottom portion 18.

Affixed to the back portion 4 are card positioning means 6 and 7 which may be, for example, a pair of parallel, spaced runners between which the card is held securely in place. Also shown in FIG. 5 are the first left reflective surface 10, the second left reflective surface 11 and the left eye viewing port 16 in the front portion 1 of the housing. The stereoscopically complementary image on the right surface of the card is reflected by a first right reflective surface 13 to a second right reflective surface 14 and then to the right eye of the observer via the right eye viewing port 17 in the front portion 1 of the housing.

The collapsible device depicted in FIG. 5 is already partially collapsed in that the front portion 1 of the housing is shown folded 90° from its vertical position. In addition, back portion 4 is attached to bottom portion 18 along back edge 19 as indicated by the four arrows in FIG. 5 and back portion 4 is perpendicular to bottom portion 18.

To collapse the device in FIG. 5, the front portion 1 is first folded 180° along fold line 41. Then, back portion 4 is folded 90° along fold line 42. The device is then folded downward 180° along central fold line 43. Thereafter, the device is folded upwards 180° along diagonal fold lines 44,45. Finally, the device is again folded downwards 270° along fold lines 46,47 to obtain a compact, flat object. In this embodiment, a protective sleeve (not shown) would be employed to protect the reflective surfaces which would be exposed on the outside surfaces of the folded-up device. In other, more sophisticated embodiments, it is possible to fold all of the reflective surfaces inwardly to thereby protect them without the need for a protective sleeve.

The foregoing description has been presented for the purposes of illustrating and describing the invention only and the scope of the invention is to be determined from the claims appended hereto.

What is claimed is:

1. A card adapted for use in a stereoscope that provides a three-dimensional image from two stereoscopically complementary images which are positioned substantially back to back relative to one another, said card comprising two stereoscopically complementary images each having an orientation, which images can be positioned, with the same orientation, substantially back to back relative to one another for viewing using said stereoscope, each of said images being viewable as a two-dimensional image independently of the complementary image and without employing the stereoscope, and wherein said two-dimensional images are not mirror images of each other.

2. A card as claimed in claim 1 which further comprises textual matter on at least a portion of one surface of said card.

3. A card as claimed in claim 1 which further comprises a magnetic strip on at least one surface of said card.

4. A card as claimed in claim 1 wherein the first of said two stereoscopically complementary images is located on the front of said card and the second of said stereoscopically complementary images is located on the back of said card.

5. A card as claimed in claim 4 which further comprises textual matter on at least a portion of one surface of said card.

6. A card as claimed in claim 4 which further comprises a magnetic strip on at least one surface of said card.

7. A card as claimed in claim 1 wherein said two stereoscopically complementary images are located on the same surface of said card and said card is foldable along a fold axis located between said images to allow positioning of said stereoscopically complementary images substantially back to back relative to one another.

8. A card as claimed in claim 7 wherein said two stereoscopically complementary images are positioned side by side on the same surface of said card.

9. A card as claimed in claim 7 wherein said two stereoscopically complementary images are positioned one above the other on said card and, when said card is unfolded, one of said images is upside down in relation to the other of said images.

* * * * *